3,382,246
CERTAIN 3-(2′-PYRIDYL)-4(3H)-QUINAZOLONES
Hans Suter, Hans Zutter, and René Bosshard, Schaffhausen, Switzerland, assignors to Eprova Limited, Schaffhausen, Switzerland
No Drawing. Filed Apr. 16, 1964, Ser. No. 360,447
Claims priority, application Switzerland, Apr. 25, 1963, 5,222/63
8 Claims. (Cl. 260—256.4)

This invention relates to hypnotic drugs, and more particularly to hypnotic agents which are derivatives of 4(3H)-quinazolinone.

We have found that compounds of the formula

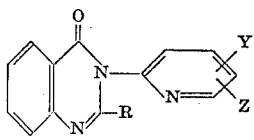

(I)

wherein R is lower alkyl, Y is lower alkyl, chlorine, or bromine, and Z in hydrogen, lower alkyl, or halogen, and their salts with physiologically tolerated strong acids are valuable hypnotic agents. The preferred strong acids are hydrochloric, hydrobromic, sulfuric, and phosphoric acids, but many organic acids may equally be employed.

The invention also relates to methods of preparing the novel quinazolinone derivatives. The preferred starting material is anthranilic acid which is converted to a quinazolinone derivative by two basic sequences of steps as follows:

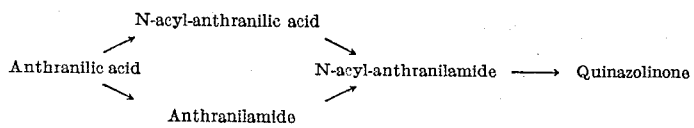

In either method, the quinazolinone ring is closed in the amide of N-acyl-anthranilic acid. The sequence of the steps may be reversed, and several steps may be combined in a single operation. The method, therefore, is capable of several specific embodiments.

Method (a)

Anthranilic acid is first converted to an N-acyl-anthranilic acid or to a reactive derivative thereof such as an intra-molecular anhydride which is thereafter reacted with a 2-aminopyridine derivative of the formula

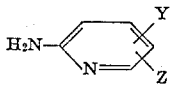

(II)

in the presence of a condensation agent.

Method (b)

A substituted N-acyl-anthranilamide of the formula

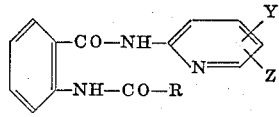

(III)

is reacted with a dehydrating agent to close the ring.

Method (c)

The ring is closed by condensation of anthranilic acid or of a reactive derivative thereof, particularly of the anhydride of an N-carboxy-anthranilic acid (isatoyl anhydride) with a 2-amino-pyridine derivative of Formula II in the presence of a derivative of a lower alkanoic acid, such as an orthoacetic or orthopropionic acid ester, of acetic anhydride, or propionic anhydride.

Method (d)

A substituted anthranilamide of the formula

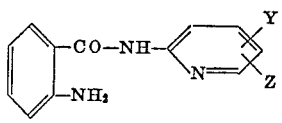

(IV)

is cyclized with a lower alkanoic acid, the latter preferably being employed in the form of its ortho-ester or as the anhydride.

R, Y, and Z have the same meanings in Formulas II to IV and throughout this specification and the appended claims as in Formula I.

The preferred intramolecular anhydrides referred to hereinabove with reference to Method (a) are of the formula

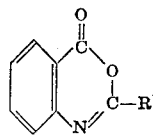

(V)

and are capable of reacting with a 2-aminopyridine of Formula II spontaneously, that is, without the use of a condensation agent to form the desired quinazolinone derivatives.

Higher yields, however, are obtained in the presence of such condensation agents as halides of phosphorus, aluminum, or boron, preferably employed together with an acid acceptor such as a tertiary base and an inert solvent. Halides and oxyhalides of phosphorus are preferred. Best yields and the smallest amounts of by-products are obtained with phosphorus trichloride or tribromide in a pyridine or alkyl pyridine solution.

The methods described hereinabove sub (a) to (d) are variations of the same basic process, and practically identical operating conditions are applicable to all.

Certain quinazolinone derivatives of Formula I are also capable of being prepared by the reaction of a metal salt of a 2-alkyl-4(3H)-quinazolinone (VI) with a reactive 2-halo-pyridine derivative (VII)

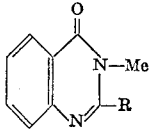

(VI)

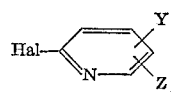

(VII)

wherein Hal is chlorine, bromine, or iodine, and Me is a metal, preferably an alkali metal, and more specifically sodium or potassium.

The quinazolinone derivatives of the invention have good to excellent sedative and hypnotic activity and are well tolerated. They are therefore useful therapeutic agents.

It is characteristic of the compounds of the invention that the amounts tolerated do not decrease substantially during repeated application, as is found in the chemically related compound QZ-2 (2-methyl-3-o-tolyl-4-(3H)-quinazolinone). This is evident from the following Table 1 in which Compound A is 2-methyl-3-(3'-methyl-2'-pyridyl)-4(3H)-quinazolinone (see Example 1 hereinbelow), and Compound B is 2-methyl-3-(5'-bromo-2'-pyridyl)-4(3H)-quinazolinone (see Example 6).

TABLE 1

| Compound | Toxicity to mice ($LD_{50}$ mg./kg.) | |
|---|---|---|
| | After 3 days | After 12 days |
| QZ-2 | 750 | 560 |
| A | 970 | 940 |
| B | 625 | 610 |

Several compounds of the invention are also effective in combating motility produced by excitants against which QZ-2 is ineffective under the same conditions. The best compounds of the invention are stronger sedatives and anticonvulsants than QZ-2. At least a few of the compounds of the invention do not produce the undesired initial excitation phase common to so many hypnotic agents.

The compounds of the invention are superior to similar compounds which lack substituents in the pyridine ring in their sedative and hypnotic effects as is evident from Table 2. In this table, Compound X is 2-methyl-3-(2'-pyridyl)-4(3H)-quinazolinone (see J. Klosa, J. prakt, Chemie 286, 84, 1961 and U.S. Patent 3,086,910). Compounds A and B are the compounds of the invention identified above with reference to Table 1. Compound C is 2-methyl-3-(5'-chloro-2'-pyridyl)-4(3H)-quinazolinone (see Example 4), and Compound D is 2-ethyl-3-(5'-chloro-2'-pyridyl)-4-(3H)-quinazolinone (see Example 5). $DH_{50}$ in the table indicates the therapeutic dose required to produce a hypnotic effect in 50% of the white mice tested. $DS_{50}$ indicates the corresponding dose necessary for a sedative effect, and $DE_{50}$ the protective dose which suppresses the spasmodic effects of electric shock (50 ma. at 100 c.p.s., 1 millisecond pulse, stimulation time 1 second) and of pentylene tetrazol (P.T. 110 mg./kg.).

TABLE 2

| Compound | Hypnotic Effect $DH_{50}$, mg./kg. | Sedative Effect $DS_{50}$, mg./kg. | Anticonvulsant Effect $DE_{50}$, mg./kg., against | |
|---|---|---|---|---|
| | | | El. shock | P.T. shock |
| X | 610 | 67 | 295 | 60 |
| A | 157 | 70 | 128 | 26 |
| B | 167 | 55 | 100 | 31 |
| C | 250 | 37 | 128 | 29 |
| D | 158 | ≦50 | 133 | 63 |

The compounds of the invention may be administered in therapeutic amounts either as such, or in mixtures with pharmacologically accepted carriers. Inert solid excipients such as starch, bolus alba, and hexoses may be combined with the active agents in a conventional manner to produce tablets. Gelatine capsules may be filled with the undiluted compounds of the invention. The compounds of the invention may be suspended in liquid excipients for oral application. The concentration of the active agent in combinations with carriers is usually between about one and 95 percent, and preferably between 10 and 80 percent.

The following examples are further illustrative of this invention, but it will be understood that the invention is not limited thereto.

Example 1.—2-methyl-3-(3'-methyl-2'-pyridyl)-4(3H)-quinazolinone 54 grams (0.47 mole) 2-amino-3-methylpyridine of 95% purity were dissolved in 50 ml. pyridine. The solution was cooled externally and 82 g. 2-methyl-4H-3,1-benzoxazin-4-one (acetylanthranil) were added with agitation in small batches. A solution of 10 ml. phosphorus trichloride in 10 ml. pyridine was added thereafter drop by drop within 30 minutes. The temperature of the reaction mixture was maintained at 10° C. to this stage.

Stirring was continued at room temperature for 30 minutes, and thereafter for approximately two hours at 100° C. The reaction mixture was then added with stirring to a solution of 110 g. sodium carbonate crystals in 1100 ml. water. A precipitate formed and gradually crystallized. It was filtered with suction, dried, and recrystallized from isopropanol. Ethyl acetate or aqueous ethanol are also suitable solvents for recrystallization.

The yield was 67 grams (60%).

The 2 - methyl - 3 - (3' - methyl - 2' - pyridyl) - 4(3H) - quinazolinone obtained had a melting point of 136–137° C. It is soluble in boiling water, cold isopropanol, and warm dilute acetic acid, readily soluble in methanol, ethanol, and benzene, and very easily soluble in acetone, chloroform, glacial acetic acid, warm methanol, ethanol, isopropanol, ethyl acetate, and benzene.

The compound forms corresponding acid addition salts with hydrochloric, hydrobromic, nitric, sulfuric, lactic, citric, and tartaric acid. The salts of the inorganic acids are readily soluble even in cold water. The salts of the organic acids mentioned are water soluble, particularly at elevated temperatures.

The hydrochloride was prepared by dissolving 1.5 g. of the base in 20 ml. hot ethanol and adding 0.5 ml. concentrated aqueous hydrochloric acid. When diethyl ether was added to the mixture, the hydrochloride crystallized upon cooling in a yield of practically 100%. It can be recrystallized from a little ethanol is so desired. It melts at 242–245° C. with decomposition. It is readily soluble in water, methanol, warm ethanol, and in chloroform, but practically insoluble in ethers and liquid petroleum hydrocarbons. The aqueous solution is strongly acid (pH 1.5–2) and not stable. The free base crystallizes gradually. When an aqueous solution of the hydrochloride is heated, the quinazolinone ring is split by saponification and N-(3'-methyl-2'-pyridyl)-N-acetyl-anthranilamide is formed.

Example 2.—2-methyl-3-(4'-methyl-2'-pyridyl)-4(3H)-quinazolinone (A) FROM ACETYLANTHRANIL AND 2-AMINO-4-METHYLPYRIDINE A mixture of 48.3 (0.3 mole) acetylanthranil and 32.4 g. 2-amino-4-methyl-pyridine was added in several small batches with cooling and agitation to 45 ml. pyridine. While the resulting reaction mixture was kept at a temperature of 5–10° C., a solution of 6 ml. phosphorus trichloride in 10 ml. pyridine was added drop by drop over a period of 30 minutes. The mixture was then heated slowly and cautiously to 80° C. A moderately exothermic reaction set in during which the reactants dissolved. Upon cessation of the spontaneous reaction, the mixture was heated with stirring to 100° C. The reaction mixture was then added to a solution of 40 g. sodium carbonate in 1000 ml. water.

A crude precipitate formed and was recovered by filtration. It was washed, dried, and recrystallized from a little isopropanol. The yield was 54.2 g. (72%). The 2-methyl-3-(4'-methyl-2'-pyridyl) - 4(3H) - quinazolinone obtained melted at 97–98° C. It is readily soluble in hot water and most organic solvents, but not in liquid petroleum hydrocarbons.

The quinazolinone ring is easily opened. 20 grams of the base were heated to 50–60° C. with a mixture of 160 ml. normal aqueous hydrochloric acid and 600 ml. water until the base dissolved. The solution was cooled, and an excess of sodium carbonate was added whereupon 18.7 g. of a product of melting point 185–186° C. were precipitated. The precipitate was recrystallized from ethanol. It was identified as N'-(4'-methyl-2'-pyridyl)-N-acetyl-anthanilamide by its chemical properties and by elementary analysis.

Calculated for $C_{15}H_{15}O_2N_3$: C, 66.90%; H, 5.61%; N, 15.61%. Found C, 66.92%; H, 5.42%; N, 15.87%.

(B) FROM N'-(4'-METHYL-2'-PYRIDYL)-N-ACETYL-ANTHRANILAMIDE

A solution of 26.9 g. N'-(4'-methyl-2'-pyridyl)-N-acetyl-anthranilamide in 25 ml. pyridine was mixed with 2 ml. phosphorus trichloride in 5 ml. pyridine, and the mixture was heated for two hours to 100° C. After the reaction mixture had cooled somewhat, it was added with stirring to a dilute sodium carbonate solution whereupon a precipitate formed. It was recovered by filtration with suction, washed, dried, and recrystallized from a little isopropanol.

The purified crystals melted at 97–98° C. and were identical with the 2-methyl-3-(4'-methyl-2'-pyridyl)-4(3H)-quinazolinone prepared by the method of this example, sub (a).

Example 3.—2-methyl-3-(6'-methyl-2'-pyridyl)-4(3H)-quinazolinone 22 grams (0.2 mole) 2-amino-6-methylpyridine and 32.5 g. (0.2 mole) acetylanthranil were added with stirring to 25 ml. pyridine. A solution of 4.4 ml. phosphorus trichloride in 10 ml. pyridine was then added, and the reaction mixture was heated to 100° C. for two hours. It was then cooled to ambient temperature and poured into a solution of 30 g. sodium carbonate in 700 ml. water with stirring. The crude precipitate formed was filtered off, washed with water, dried, and ultimately recrystallized from methyl acetate. The yield was 31.2 g. (62%).

The 2-methyl-3-(6'-methyl-2'-pyridyl-4(3)H)-quinazolinone obtained melted at 131–132° C. It is only sparingly soluble in water, diethyl ether, di-isopropyl ether, and dilute acetic acid, but is readily soluble in dilute mineral acids (hydrochloric, nitric acid) whereby the corresponding addition salts are formed, also in methanol, ethanol, acetone, chloroform, and glacial acetic acid.

Example 4.—2-methyl-3-(5'-chloro-2'-pyridyl)-4(3H)-quinazolinone 28.7 grams (0.22 mole) 2-amino-5-chloropyridine and 32 g. (0.2 mole) acetylanthranil were admixed with stirring to 36 ml. pyridine. The suspension formed was kept at 10° C. by external cooling while 3.2 ml. phosphorus trichloride were added. The reaction mixture was further stirred at 100–105° C. for 2 to 3 hours, whereby all solids were dissolved.

The hot reaction mixture was added with stirring to 700 ml. 10% sodium carbonate solution. A precipitate formed which was initially oily, but gradually crystallized. The solid mass was broken up, recovered from the liquid by filtration with suction, washed, dried, and recrystallized from isopropanol. The yield was 44.1 g. (81%) and the melting point 151–152° C. The 2-methyl-3-(5'-chloro-2'-pyridyl)-4(3H)-quinazolinone is only sparingly soluble in water, diethyl ether, and petroleum hydrocarbons, but readily soluble in hot ethanol, in chloroform, and in glacial acetic acid.

It is converted to the hydrochloride by reaction with an equivalent amount of hydrochloric acid in the cold. The hydrochloride melts at 265–269° C. with decomposition. It dissolves in much water.

Example 5.—2-ethyl-3-(5'-chloro-2'-pyridyl)-4(3H)-quinazolinone (A) 2-ETHYL-4H-3,1-BENZOXAZIN-4-ONE (PROPIONYL-ANTHRANIL)

68.5 grams anthranilic acid were admixed in small batches to 200 g. propionic anhydride heated to 100° C. The anthranilic acid dissolved in an exothermic reaction. When the reaction subsided, the mixture was heated to 180° C. for about ninety minutes, whereby the free propionic acid formed was distilled off. The reaction mixture was then evaporated to dryness in a vacuum. The residue was stirred into petroleum ether (B.P. 60–90° C.), and propionylanthranil was recovered from the petroleum ether medium in crystalline form. The crystals were recrystallized from a mixture of ethyl acetate and petroleum ether. The yield was 61.7% of the pure propionylanthranil, the melting point 84° C.

26.3 grams (0.15 mole) propionylanthranil and 19.3 g. (0.15 mole) 2-amino-5-chloropyridine were admixed to 30 g. pyridine with external cooling. A solution of 3.1 ml. phosphorus trichloride in 5 ml. pyridine was added drop by drop, and the resultant mixture was heated to 100° C. for two hours. It was then stirred into 700 ml. 5% sodium carbonate solution, and the precipitate formed was filtered off, washed, dried, and recrystallized from a mixture of ethyl acetate and petroleum ether. The yield was 35 g. (81%). The 2-ethyl-3-(5'-chloro-2'-pyridyl)-4(3H)-quinazolinone melts at 112–113° C. It is sparingly soluble in water, but readily soluble in methanol, ethanol, acetone, ethyl acetate, benzene, chloroform, and glacial acetic acid.

Example 6.—2-methyl-3-(5'-bromo-2'-pyridyl)-4(3H)-quinazolinone

A mixture of 17.5 g. (0.1 mole) 5-bromo-2-aminopyridine and 16.1 g. (0.1 mole) acetylanthranil was admixed to 20 ml. pyridine while cooling with ice. A solution of 2 ml. phosphorus trichloride in 5 ml. pyridine was added very carefully and drop by drop. Cooling was discontinued, and a weakly exothermic reaction was thereby initiated. It was completed by 30 minutes heating to 100° C. The reaction mixture was stirred into 350 ml. of a 10% aqueous sodium carbonate solution.

A crystalline product precipitated, and was filtered off with suction after 60 minutes. It was washed, dried, and recrystallized from aqueous ethanol. The yield was 25.5 g. (81%). The 2-methyl-3-(5'-bromo-2'-pyridyl)-4(3H)-quinazolinone obtained melted at 146–147° C. It is only sparingly soluble in water, diethyl ether, di-isopropyl ether, and benzene, soluble in methanol, ethanol, acetone, and warm ethyl acetate, and very readily soluble in glacial acetic acid and chloroform.

The hydrochloride was obtained by adding 0.5 ml. concentrated hydrochloric acid to a solution of 1.9 g. of the base in 30 ml. hot ethanol. It is only slightly soluble in water and most organic solvents. It melts with decomposition of about 275–280° C.

The lactate and citrate of 2-methyl-3-(5'-bromo-2'-pyridyl)-4(3H)-quinazolinone were prepared in an analogous manner. They also are not readily soluble in water.

Example 7.—2-methyl-3-(3',5'-dichloro-2'-pyridyl)-4(3H)-quinazolinone 21.5 g. (0.145 mole) 2-amino-3,5-dichloropyridine and 23.5 g. (0.145 mole) acetylanthranil were admixed to 50 ml. pyridine. While the suspension formed was cooled to 5–10° C., a solution of 2.9 ml. phosphorus trichloride in 5 ml. pyridine was added drop by drop. The mixture was then heated to 100° C. for two hours. A solution was obtained which was added with stirring to a solution of about 5–10% sodium carbonate in water. A crystalline precipitate was formed. It was filtered off with suction, washed, dried, and recrystallized from ethyl acetate. The yield was 30.7 g. (70%). The 2-methyl-3-(3',5'-dichloro-2'-pyridyl)-4(3H)-quinazolinone formed melted at 179–180° C. It is only slightly soluble in water, diethyl ether, and liquid petroleum hydrocarbons, but readily soluble in chloroform and glacial acetic acid.

Example 8.—2-methyl-3-(3',5'-dibromo-2'-pyridyl)-4(3H)-quinazolinone 25.2 grams (0.1 mole) 2-amino-3,5-dibromopyridine and 16.2 g. (0.1 mole) acetylanthranil were admixed to 30 ml. of pyridine. The suspension obtained thereby was kept at 5° C. while a solution of 2.2 g. phosphorus trichloride in 5 ml. pyridine was added drop by drop. The reaction mixture was thereafter held at room temperature for 30 minutes with stirring, and stirring was continued for 2 to 2½ hours while the mixture was heated to 100° C.

The mixture was cooled thereafter to 50° C. and stirred into a 7% sodium carbonate solution. An oily precipitate formed, and crystallized upon standing overnight. The solid mass was broken up, separated from the liquid by filtration, washed, dried, and recrystallized from a little glacial acetic acid. The yield was 33 g. (83.5%).

The 2 - methyl - 3 - (3',5' - dibromo - 2' - pyridyl) - 4 (3H)-quinazolinone obtained melted at 183–184° C. It is only sparingly soluble in water, diethyl ether, and liquid petroleum hydrocarbons, but very soluble in boiling alkanols such as methanol, ethanol, iso propanol, also in hot ethyl acetate, benzene, and in chloroform.

Example 9.—2-methyl-3(4',6'-dimethyl-2'-pyridyl)-4 (3H)-quinazolinone

A mixture of 49 g. (0.4 mole) 2-amino-4,6-dimethylpyridine, 65 g. (0.4 mole) acetylanthranil, and 60 ml. pyridine was reacted with 8.8 ml. phosphorus trichloride in a manner analogous to the procedure of Example 6, and the reaction mixture was worked up in the same manner. There were obtained about 70 g. (66%) of 2-methyl-3- (4',6' - dimethyl - 2' - pyridyl) - 4(3H) - quinazolinone melting at 153–154° C. The compound is not very soluble in water, diethyl ether, and petroleum hydrocarbons, but soluble in acetone and benzene, and very soluble in chloroform and glacial acetic acid. It dissolves in dilute mineral acids and lactic acid, and the corresponding acid addition salts are formed.

Example 10

The compounds of the invention are administered by mouth in the form of tablets, capsules, or liquid suspensions containing 50 to 500 mg. of the active agents per dose, depending on the desired sedative or hypnotic effect.

(A) 75 MG. TABLETS

An inert tablet base was prepared from 42 parts (by weight) sucrose, 42 parts pre-granulated lactose, 12 parts corn starch, and 4 parts magnesium stearate, U.S.P. XV. The tablet base was blended with 2-methyl-3-(5'-bromo-2'-pyridyl)-4(3H)-quinazolinone, and the mixture was tableted on a conventional press to prepare tablets weighing 0.5 gram each and containing 75 mg. of the active agent.

(B) 200 MG. TABLETS

The inert tablet base described above was mixed with 2 - methyl - 3 - (3' - methyl - 2' - pyridyl) - 4(3H)-quinazolinone in an amount sufficient to yield tablets each weighing 0.75 gram and containing 200 mg. of the active agent.

(C) 150 MG. TABLETS

A tablet base was prepared from 5 parts sucrose, 5 parts lactose, 60 parts tapioca starch, 30 parts bolus alba, and a very small amount of magnesium stearate, U.S.P. XV. The finely powdered and intimately mixed base was further admixed with enough 3 - methyl - 3 - (5' - bromo-2'-pyridyl)-4(3H)-quinazolinone to make tablets weighing 0.5 gram each and containing 150 mg. of the active agent.

(D) 300 MG. TABLETS

Enough 2 - methyl - 3 - (3' - methyl - 2' - pyridyl)-4(3H)-quinazolinone was mixed with the tablet base described sub (c) above to make 0.75 gram tablets each containing 300 mg. of the active agent.

(E) CAPSULES

Gelatine capsules of adequate size were charged with batches of 0.10 gram finely powdered pure 2 - methyl - 3- (5' - bromo - 2' - pyridyl) - 4(3H) - quinazolinone.

(F) SUSPENSION

Sesame oil was sterilized at 120° C. for 2½ hours. Nine parts of the oil and one part of finely pulverized 2-methyl-3 - (5' - bromo - 2' - pyridyl) - 4(3H) - quinazolinone were treated in a colloid mill until a permanent dispersion of the active agent in the oil base was obtained.

While the invention has been described with particular reference to specific embodiments, it is to be understood that it is not limited thereto, but is to be construed broadly, and restricted solely by the scope of the appended claims.

What we claim is:
1. A derivative of 4(3H) - quinazolinone selected from the group consisting of compounds of the formula

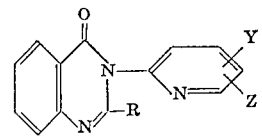

wherein R is lower alkyl; Y is a member of the group consisting of lower alkyl, chlorine and bromine; and Z is a member of the group consisting of hydrogen, lower alkyl, chorine, and bromine; and of addition salts of said compounds with physiologically tolerated acids.

2. A derivative according to claim 1, wherein Z is hydrogen.

3. A derivative according to claim 1, wherein R is methyl, Y is lower alkyl, and Z is hydrogen.

4. A derivative according to claim 1, wherein Y is a halogen, and Z is hydrogen.

5. A derivative according to claim 1, wherein R is methyl, and Y and Z are equal and halogen in positions 3' and 5'.

6. A derivative according to claim 1, wherein R and Y are methyl, and Z is hydrogen.

7. A derivative according to claim 1, wherein Y is a halogen in position 5', and Z is hydrogen.

8. 2 - methyl - 3 - (3' - methyl - 2' - pyridyl) - 4(3H)-quinazolinone.

References Cited

UNITED STATES PATENTS

| | | | |
|---|---|---|---|
| 3,073,826 | 1/1963 | Scarborough | 260—256.4 |
| 3,165,519 | 1/1965 | Brown | 260—256.4 |
| 2,872,370 | 2/1959 | Berger | 167—52 |
| 3,102,072 | 8/1963 | Arnold et al. | 167—52 |
| 3,047,462 | 7/1962 | Maillard et al. | 260—256.4 X |
| 3,086,910 | 4/1963 | Shetty et al. | 260—256.4 X |
| 2,439,386 | 4/1948 | Guenther et al. | 260—251 |
| 3,162,634 | 12/1964 | Klosa | 260—251 |
| 3,213,094 | 10/1965 | Morgan et al. | 260—256.4 |

OTHER REFERENCES

Elderfield, Heterocyclic Compounds, vol. 6, New York, John Wiley and Sons, Inc., 1957, p. 333. Call No. QD 400–E4.

NICHOLAS S. RIZZO, Primary Examiner.

HENRY R. JILES, Examiner.

M. O'BRIEN, R. J. GALLAGHER,
*Assistant Examiners.*